United States Patent
Harris et al.

(10) Patent No.: US 7,036,411 B1
(45) Date of Patent: May 2, 2006

(54) ACTIVE MEASUREMENT AND CONTROL SYSTEM FOR A MATERIAL CUTTING APPARATUS

(75) Inventors: Gerald R. Harris, Chouteau, OK (US); Mark P. Richards, Chouteau, OK (US); Michael L. Jackson, Tulsa, OK (US)

(73) Assignee: HEM, Inc., Pryor, OK (US)

( * ) Notice: Subject to any disclaimer, the term of this patent is extended or adjusted under 35 U.S.C. 154(b) by 382 days.

(21) Appl. No.: 10/176,120

(22) Filed: Jun. 21, 2002

(51) Int. Cl.
*B23D 55/04* (2006.01)
*B23D 55/08* (2006.01)
*B26D 5/00* (2006.01)
*G05B 19/19* (2006.01)

(52) U.S. Cl. .............. 83/34; 83/36; 83/42; 83/54; 83/364; 83/367; 83/368; 83/581; 83/794; 83/811; 83/812; 700/167; 700/192; 700/195

(58) Field of Classification Search .............. 83/34, 83/35, 36, 42, 54, 56, 240, 360, 364, 365, 83/367, 368, 581, 794, 797, 798, 801, 809, 83/810, 811, 812; 700/167, 171, 192, 195
See application file for complete search history.

(56) References Cited

U.S. PATENT DOCUMENTS

| | | | |
|---|---|---|---|
| 3,474,693 A | 10/1969 | Wilkie et al. | |
| 3,504,585 A | 4/1970 | Harris | |
| 3,552,254 A | 1/1971 | Marczy | |
| 3,610,299 A * | 10/1971 | Jureit et al. | 83/76.4 |
| 3,718,061 A | 2/1973 | Wilkin | |
| 3,811,353 A | 5/1974 | Miles | |
| 3,910,142 A | 10/1975 | Jureit et al. | |
| 3,941,019 A | 3/1976 | Baldwin et al. | |
| 4,080,858 A | 3/1978 | Stolzer | |
| 4,117,756 A | 10/1978 | Harris | |
| 4,175,458 A | 11/1979 | Paris, Jr. et al. | |
| 4,179,961 A | 12/1979 | Harris | |
| 4,364,311 A | 12/1982 | Platt, III | |
| 4,463,845 A | 8/1984 | Harris | |
| 4,616,542 A * | 10/1986 | Hards | 83/155 |
| 4,640,160 A * | 2/1987 | Hards | 83/75.5 |
| 4,672,871 A | 6/1987 | Gudmestad | |
| 4,766,790 A | 8/1988 | Harris | |
| 4,893,533 A | 1/1990 | Harris | |
| 4,901,612 A | 2/1990 | Harris | |
| 5,052,452 A * | 10/1991 | Goenner | 144/4.9 |
| 5,119,310 A * | 6/1992 | Moriya | 700/192 |
| 5,163,663 A | 11/1992 | Harris | |
| 5,208,760 A * | 5/1993 | Moriya | 700/195 |

(Continued)

Primary Examiner—Clark F. Dexter
(74) Attorney, Agent, or Firm—McAfee & Taft

(57) ABSTRACT

An active measurement and control system for a material cutting apparatus. The apparatus comprises a cutting tool which may be pivoted for cutting a workpiece in a cutting area at a selectable angle. The cutting area defines a datum plane, and a feed table with a shuttle vise is used to move the workpiece toward the cutting area. A controller controls the feed distance of the shuttle vise and the cutting angle of the tool in response to a signal from a sensor used for sensing a transverse dimension of the workpiece relative to the datum plane. In this way, the feed distance and cutting angle are adjusted to compensate for variations in the transverse dimension. This transverse dimension can include a displacement from the datum plane of a distal and/or proximate surface of the workpiece. A method of cutting a workpiece is also disclosed.

20 Claims, 14 Drawing Sheets

U.S. PATENT DOCUMENTS

| | | |
|---|---|---|
| 5,299,480 A | 4/1994 | Harris et al. |
| 5,353,910 A | 10/1994 | Harris et al. |
| 6,145,424 A | 11/2000 | Matsuda et al. |
| 6,212,437 B1 | 4/2001 | Harris |
| 6,216,574 B1 | 4/2001 | Hain |
| 6,308,604 B1 | 10/2001 | Guzowski |
| 6,615,100 B1 * | 9/2003 | Urmson ...................... 700/167 |
| 6,698,159 B1 | 3/2004 | Harris et al. |

* cited by examiner

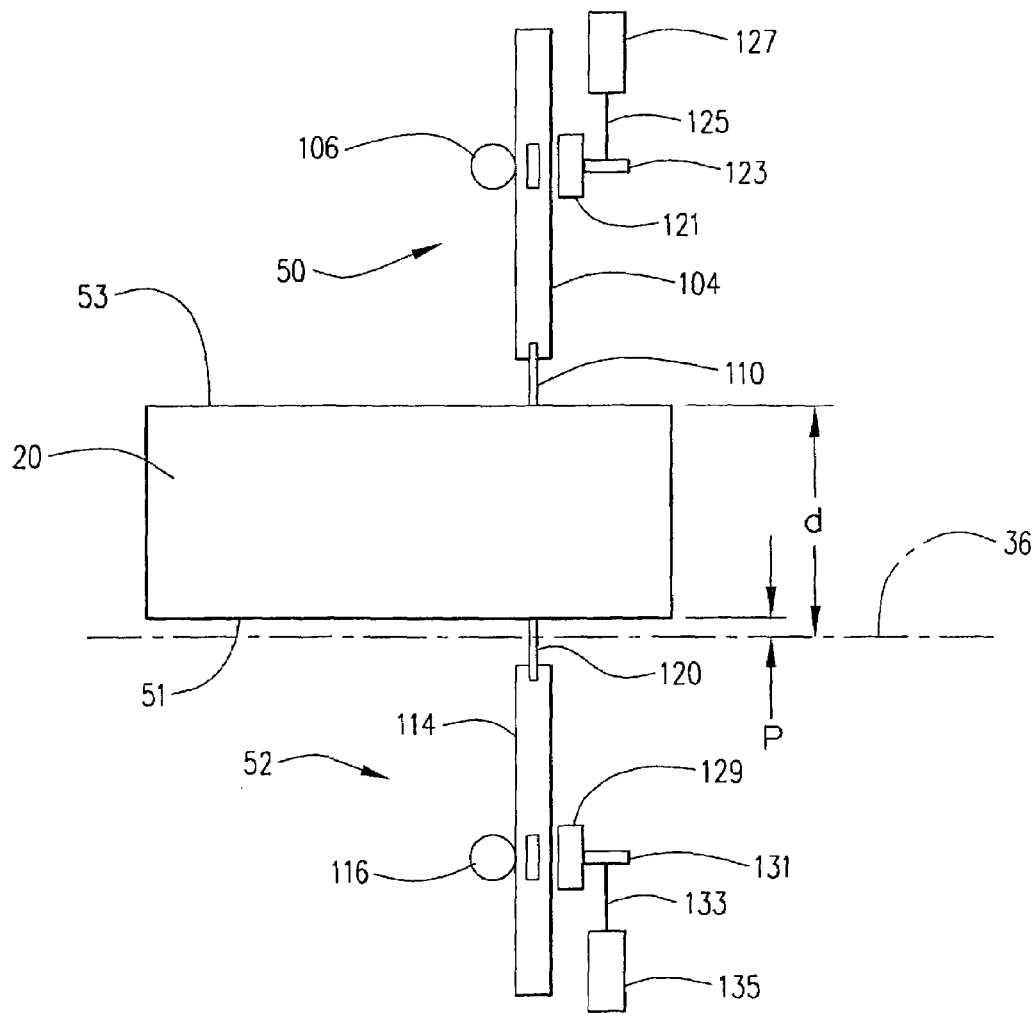
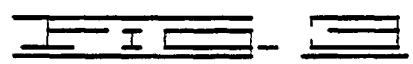

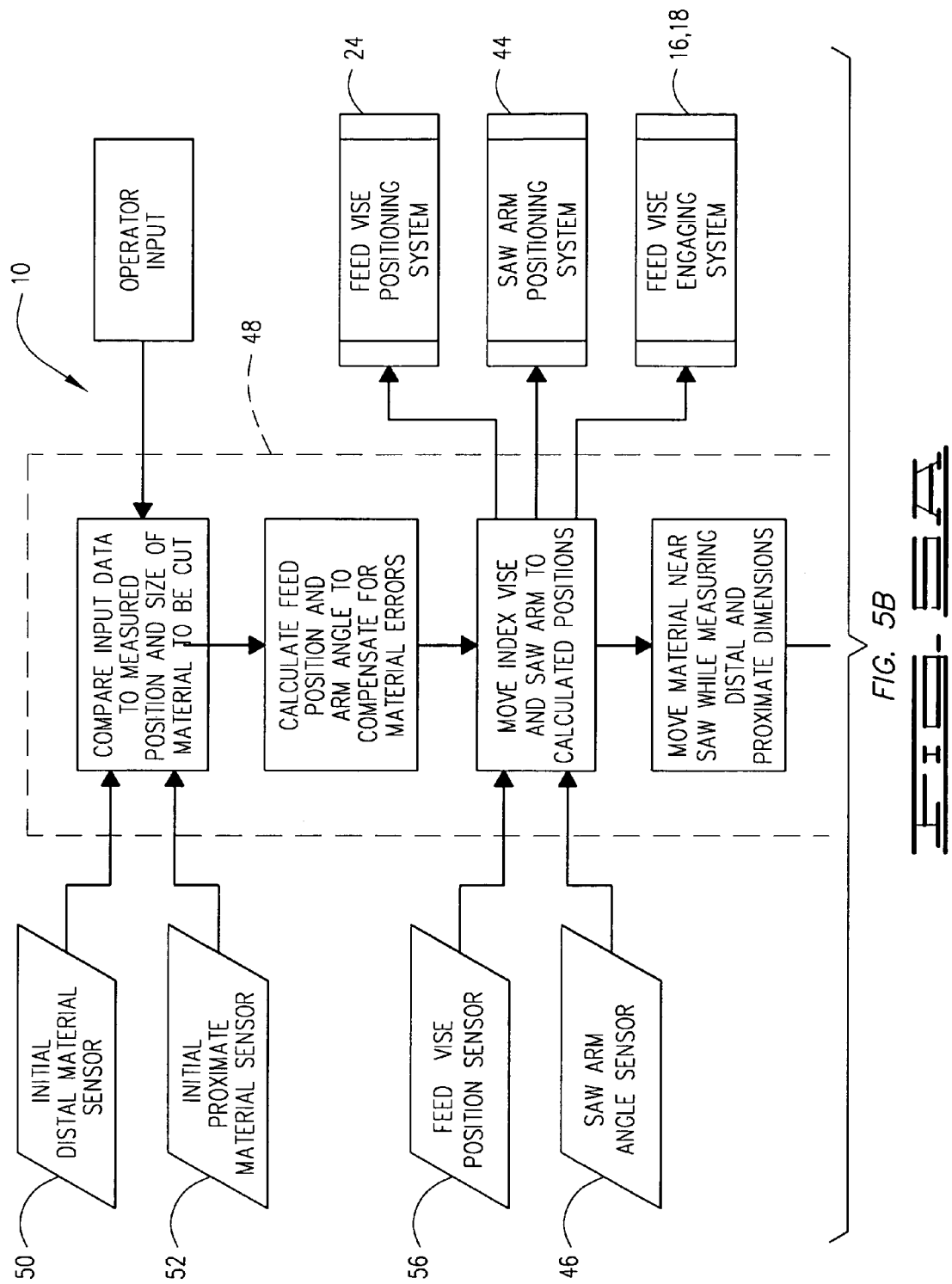

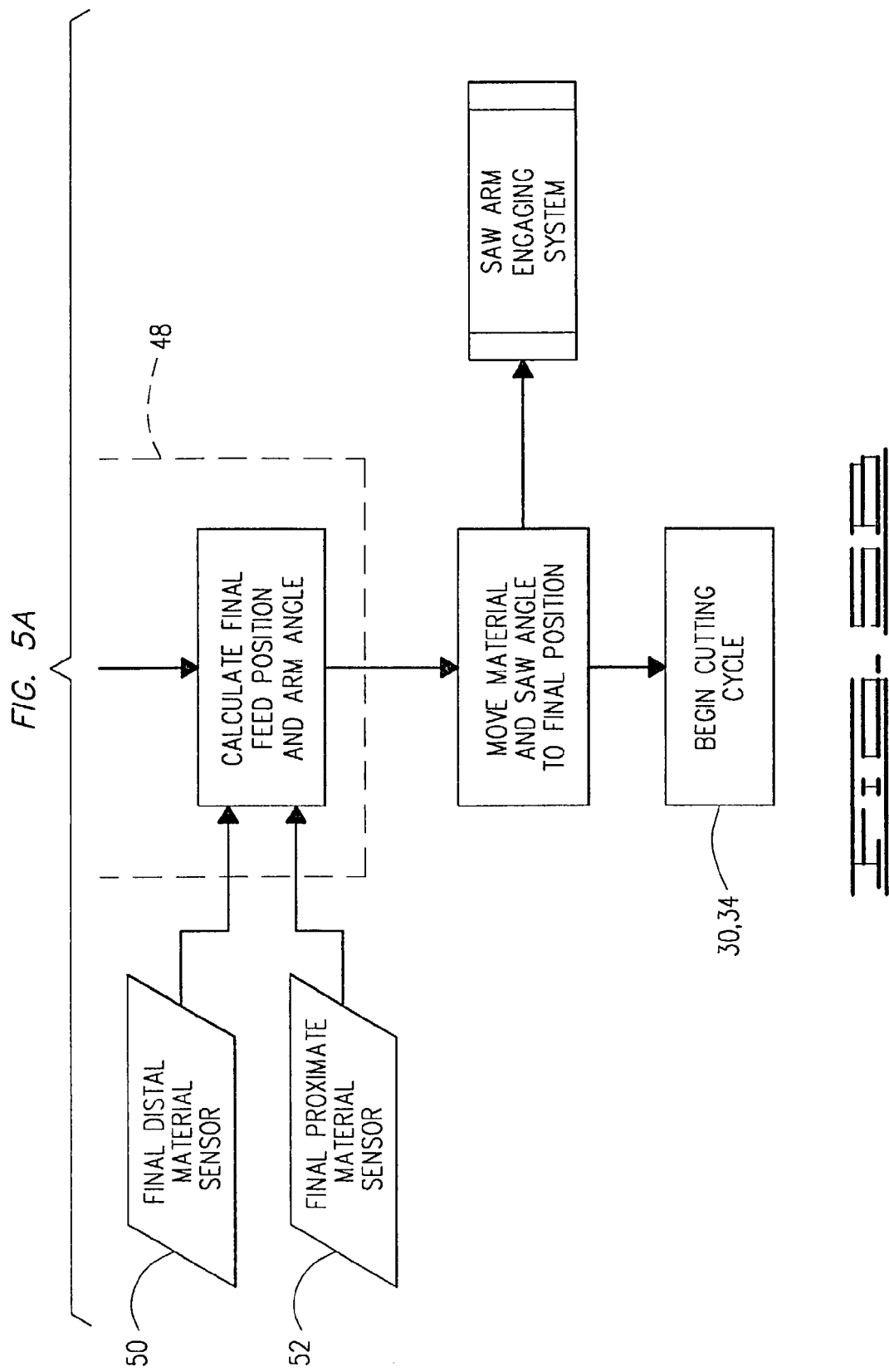

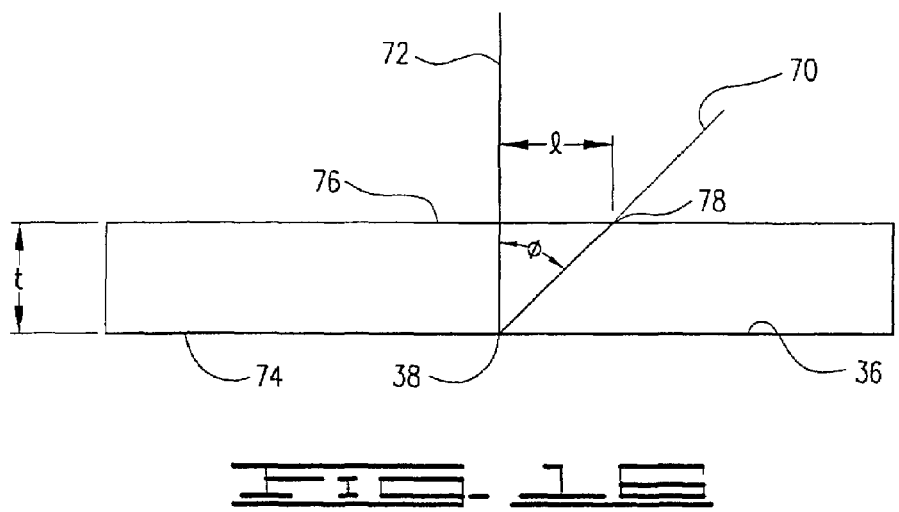
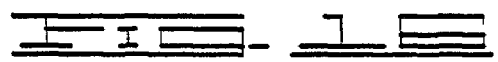
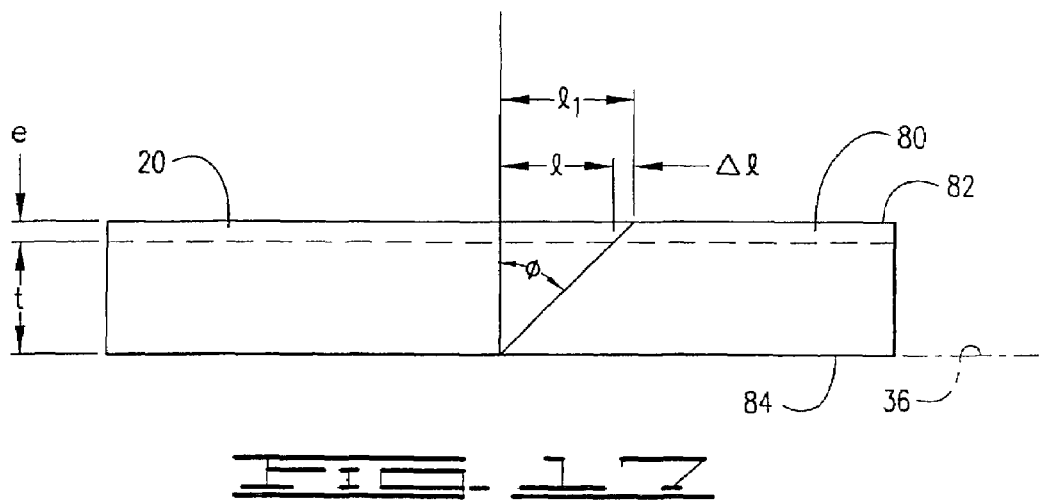
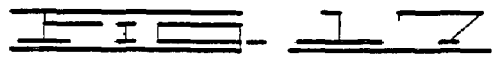

ACTIVE MEASUREMENT AND CONTROL SYSTEM FOR A MATERIAL CUTTING APPARATUS

BACKGROUND OF THE INVENTION

1. Field of the Invention

This invention relates to material cutting apparatus, such as industrial miter saws, and more particularly, to a measurement and control system for these apparatus which provides accurate cutting of elongated workpieces by actively determining variations in material distal and proximate displacement from a known datum plane and compensating therefor.

2. Description of the Prior Art

Material cutting devices, such as saws, used to cut parts from elongated workpieces are well known. Typically, an elongated workpiece is positioned on a feed table and moved toward a cutting area on the saw by means of a shuttle vise. The shuttle vise engages the elongated workpiece and moves it the desired amount (the "feed length"), and the saw is then used to cut the part. Certain accuracy in the cutting of the parts is necessary, and relatively tight tolerances may be desirable.

When making a "square" cut, one in which the cutting plane is substantially perpendicular to the longitudinal axis of the elongated workpiece, maintaining accuracy is relatively straightforward. Once a part is cut, the material is fed into the saw to the desired dimension, and another cut is made. There are a variety of known devices for maintaining the accuracy of the feeding of the workpiece.

However, when the piece is cut at an angle which is not perpendicular to the axis of the workpiece, referred to as an "angled" cut or "miter" cut, maintaining accuracy becomes much more complicated, particularly when the angle of one end cut differs from the angle of the other end cut. Not only is the feed length of the material important, but also the angle at which the saw passes through the workpiece to cut the part. Miter saws typically have controls for adjusting this cutting angle and feed length. In the process of maintaining desired tolerances on feed length and cutting angle, variations in the material dimensions and location add complications. Stock material tolerances on metal workpieces may not be nearly accurate enough to be relied upon as a basis for making the cuts. That is, the cross-sectional dimensions and shapes can vary enough to affect the cut length. Warping and curvature along the length of the material can also affect the dimensions of the cut piece. Current miter saws have no automatic way of compensating for these problems and controlling the saw accordingly.

The problem is to adjust the cutting process so that stock with standard material tolerances may be utilized and produce parts to critical design dimensions. In the past, the main difficulty was that the feed lengths and cutting angles called for by the miter saw controller were fixed and necessarily based on nominal material dimensions and a fixed location of the material. Some improvements have been made by the operator measuring the actual dimensions of the workpiece and manually adjusting the saw controller to compensate. This process has had mixed results because of variation in location of the parts, such as described further herein, and the necessary but inaccurate assumption that the stock size is uniform along the entire length of the workpiece. Also, it has been necessary for the operator to edit the programming of the controller to compensate for the errors observed in earlier cuts. This practice can result in wasted material as well as time delays in production.

There is a need, therefore, for a control system for material cutting apparatus, such as a miter saw, which can actively measure the workpiece and use this information to compensate for these errors. This system would control the positioning of the workpiece and the cutting angle to obtain the desired tolerances in the final parts. The present invention meets this need by providing an active measurement and control system which determines variations in material displacement from a datum plane to proximate and distal surfaces of the workpiece, transmits this information to a central processing unit in the control system for the miter saw, and automatically adjusts the feed length of the workpiece and the cutting angle of a saw head of the saw to compensate for the variations. The problems caused by material location and variations are eliminated or minimized by measuring distal and proximate displacement dimensions of the material actively and automatically with distal and proximate displacement sensors. The feed lengths and cutting angles are then adjusted during the process to provide the necessary compensation in real time in order to maintain the important dimensional criteria of the finished parts. This eliminates the need for test parts and the intermediate program editing described above, and provides for continuous automatic adjustments as the distal and proximate displacements change.

SUMMARY OF THE INVENTION

The present invention includes a material cutting apparatus with an active measurement and control system for measuring distal and proximate displacement dimensions on an elongated workpiece and which adjusts the cutting feed length and cutting angle of the saw to compensate in real time for variations in these distal and proximate displacement dimensions and to cut parts from the workpiece to specified dimensional criteria and tolerances. In an illustrated embodiment, the apparatus is a miter saw, but the control system may be used with other types of cutting apparatus.

Generally, the invention may be described as a sawing apparatus comprising a miter saw having a cutting area and a saw head which may be pivoted relative to a datum line or plane about a center of pivotation for cutting a workpiece at a selectable angle, a feed table adjacent to the miter saw and adapted for supporting the workpiece, a shuttle vise engagable with the workpiece for moving the workpiece toward the cutting area of the miter saw, a controller for controlling a feed length of the shuttle vise and a cutting angle of the saw head wherein the controller comprises a central processing unit, and a sensor for sensing a transverse dimension related to the workpiece relative to the datum plane and transmitting a dimensional signal to the central processing unit whereby the feed distance and cutting angle are adjusted to compensate for variations in the transverse dimension. The sensor can actively sense the transverse dimension and transmit the dimensional signal in real time as the shuttle vise moves the workpiece toward the cutting area of the miter saw.

The transverse dimension may be a distal displacement from the datum line to a distal surface of the workpiece or a proximate displacement from the datum line to a proximate surface of said workpiece.

In one embodiment, the sensor is a first or distal sensor for sensing the distal displacement, and transmitting a first or distal dimensional signal to said central processing unit, and the apparatus further comprises a second or proximate sensor for sensing the proximate displacement, and transmitting a corresponding second or proximate dimensional signal to said central processing unit. Preferably, the first and second sensors can sense the distal and proximate displacements and transmit the first and second dimensional signals in real time as the shuttle vise moves the workpiece toward the cutting area of the miter saw.

The invention also includes a method of cutting parts from an elongated workpiece on a miter saw comprising the steps of (a) selecting a nominal transverse dimension of the workpiece, (b) selecting at least two important dimensional criteria of the parts, such as a first length dimension, a second length dimension, a linear offset between said first and second length dimensions, a first cutting angle and a second cutting angle, (c) determining an actual transverse dimension of the workpiece, and (d) generating a feed length of the workpiece and a cutting angle of the saw in response to any variation between the actual and nominal transverse dimensions, such that when the saw cuts the part from the workpiece the selected dimensional criteria are substantially maintained. Step (c) may comprise measuring a displacement of the workpiece relative to a datum plane defined by the miter saw. This displacement may be a distal displacement of a distal surface of the workpiece, and/or a proximate displacement of a proximate surface of the workpiece. The displacement is preferably measured as the workpiece is fed toward said saw. The transverse direction extends between the proximate and distal surfaces.

Step (c) may comprise generating a signal in response to the transverse dimension and transmitting the signal to a controller of the miter saw.

Step (d) may comprise adjusting the feed length to compensate for a kerf dimension of the saw.

In one embodiment, the dimensional criteria include one of the length dimensions and both the first and second cutting angles. In another embodiment, the dimensional criteria include the first and second length dimensions and one of the first and second cutting angles. In an additional embodiment, the dimensional criteria include the first and second length dimensions and the linear offset between them.

Step (b) preferably comprises transmitting the dimensional criteria to a controller of the saw.

Numerous ends and advantages of the invention will become apparent as the following detailed description of the preferred embodiment is read in conjunction with the drawings which illustrate such embodiment.

BRIEF DESCRIPTION OF THE DRAWINGS

FIG. 3 is a detail of the front elevation showing material distal and proximate displacement sensors used on the saw.

FIGS. 5A and 5B show a flow chart for the control system.

FIG. 16 shows how the cutting plane is measured.

FIG. 17 shows the error in cutting length caused by a variation in the size of the material of the workpiece.

DESCRIPTION OF THE PREFERRED EMBODIMENT

Figure 1:
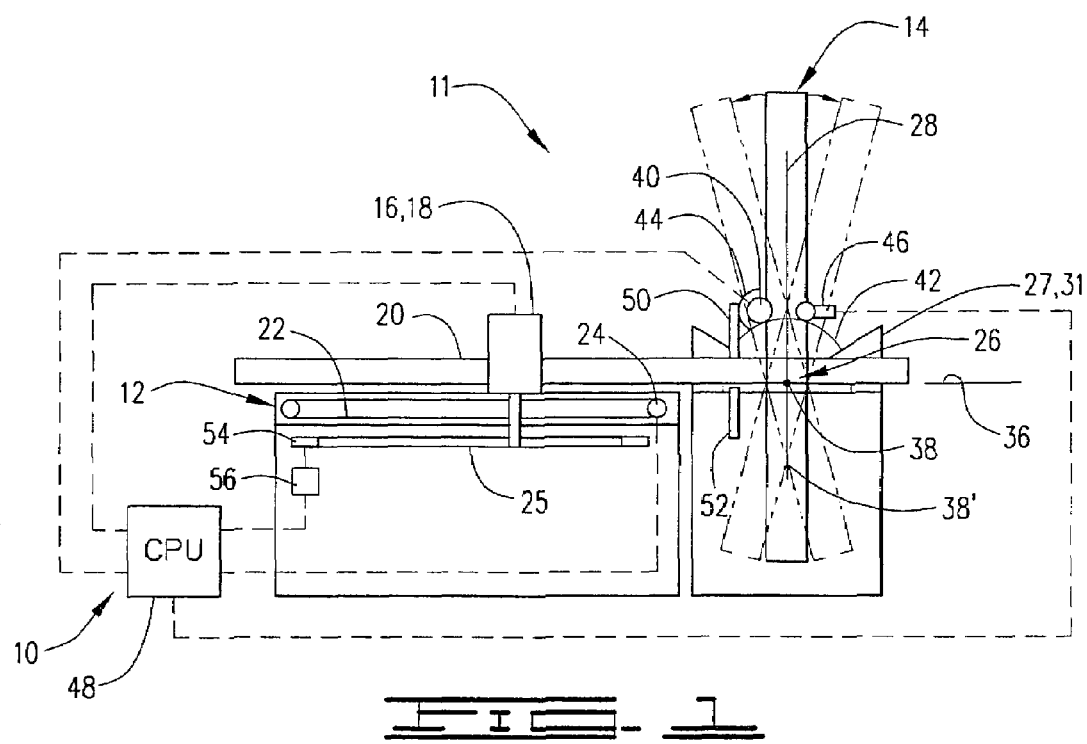
FIG. 1 shows a front elevation of a miter saw with the measurement and control system of the present invention.
Figure 2:
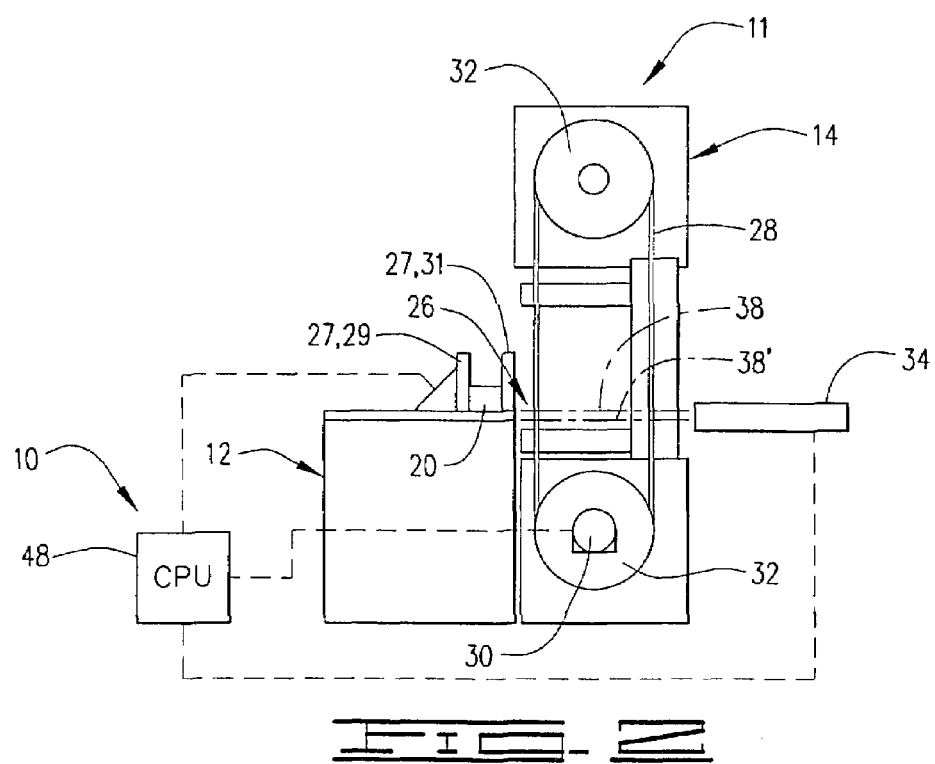
FIG. 2 is right elevation of the miter saw.

Referring now to the drawings, and more particularly to FIGS. 1 and 2, the measurement and control system for a material cutting apparatus of the present invention is shown and generally designated by the numeral 10. The cutting apparatus is illustrated as a miter saw designated by the numeral 11. The major components of saw 11 are a feed table 12 and a saw head 14. Feed table 12 moves a measured length of workpiece 20 through cutting area 26 by methods known in the art. For example, but not by way of limitation, feed table 12 includes a shuttle or feed vise 16 with jaws 18 which are used engage a workpiece 20. Jaws 18, and thus, workpiece 20 may be moved longitudinally along feed table 12 in a conventional manner, such as by a chain and sprocket drive 22 connected to vise 16 and powered by a vise drive motor 24. In this way, workpiece 20 can be moved toward a cutting area 26 adjacent to saw head 14. A vise position measuring system 25 is connected to shuttle vise 16.

A saw vise 27 engages workpiece 20 for the actual cutting operation. Saw vise 27 has a pair of jaws 29 and 31. Jaw 29 is omitted from FIG. 1 for clarity.

Saw head 14 has a saw blade 28 therein driven by a saw drive motor 30 around large pulleys 32 in a known manner. As seen in FIG. 2, saw head 14 may be moved transversely toward and away from cutting area 26 by a hydraulic cylinder 34 or other means, such as a screw drive, etc.

A datum line or plane 36 is defined in cutting area 26, and preferably, a pivot axis 38 of saw head 14 is coplanar with datum line 36 and thus is shown as a point 38 in the datum line in FIG. 1. Saw head 14 may pivot about pivot axis 38 by methods known in the art. For example, but not by way of limitation, a gear drive system including a pinion gear 40 engaging a substantially circular pivot gear rack 42. A pivot motor 44 is connected to pinion gear 40. Pinion gear 40 and motor 44 are mounted on saw head 14. Rack 42 is stationary. By actuating motor 44 and rotating pinion gear 40, saw head 14 may be tilted in either direction from the vertical or perpendicular position shown in FIG. 1. Other methods could use a hydraulic cylinder or other type of actuator.

However, the pivot point may not be in datum plane 36 as indicated by pivot point 38' in FIG. 1. In such cases, the feed length of the part must be adjusted to compensate for this variance in a manner known in the art. The pivot point may also be out of alignment with saw blade 28, and compensation must also be made for this in a manner known in the art.

Control system 10 comprises a saw head position sensor 46 which transmits a saw head position signal corresponding to the position of saw head 14 to a central processing unit (CPU) 48 in the control system. Such sensors may be of a kind known in the art. For example, but not by way of limitation, head position sensor 46 may be an optical sensor such as an optical encoder manufactured by EPC. A magnetic encoder such as one manufactured by SIKO Products, Inc. would be another example.

The position of feed vise 16 is monitored by methods known in the art. For example, but not by way of limitation, vise position measuring system 25 includes a timing belt and pulley system 54 that is monitored by a vise position sensor 56 such as an optical encoder manufactured by EPC. A magnetic encoder such as one manufactured by SIKO Products, Inc. would be another example. As workpiece 20 is moved by shuttle vise 16 as previously described, vise position sensor 56 sends a vise position signal to CPU 48 corresponding to the longitudinal position of workpiece 20. The vise position signal thus determines the feed length of workpiece 20 as will be further described herein.

As also seen in FIGS. 1 and 2, pivot motor 44 and vise drive motor 24 are all connected to CPU 48 and controlled thereby as will be further described herein. Similarly, cylinder 34 and/or saw drive motor 30 may be connected to CPU 48.

Control system 10 also comprises a distal displacement sensor 50 that sends a distal displacement signal to CPU 48 corresponding to the displacement of the distal surface of workpiece 20 from datum line 36. Control system 10 further comprises a proximate displacement sensor 52 that sends a proximate displacement signal to CPU 48 corresponding to the displacement of the proximate surface of workpiece 20 from datum line 36, if any. Control system 10 may be adapted to use distal displacement sensor 50 or proximate displacement sensor 52, or both.

Figure 4:
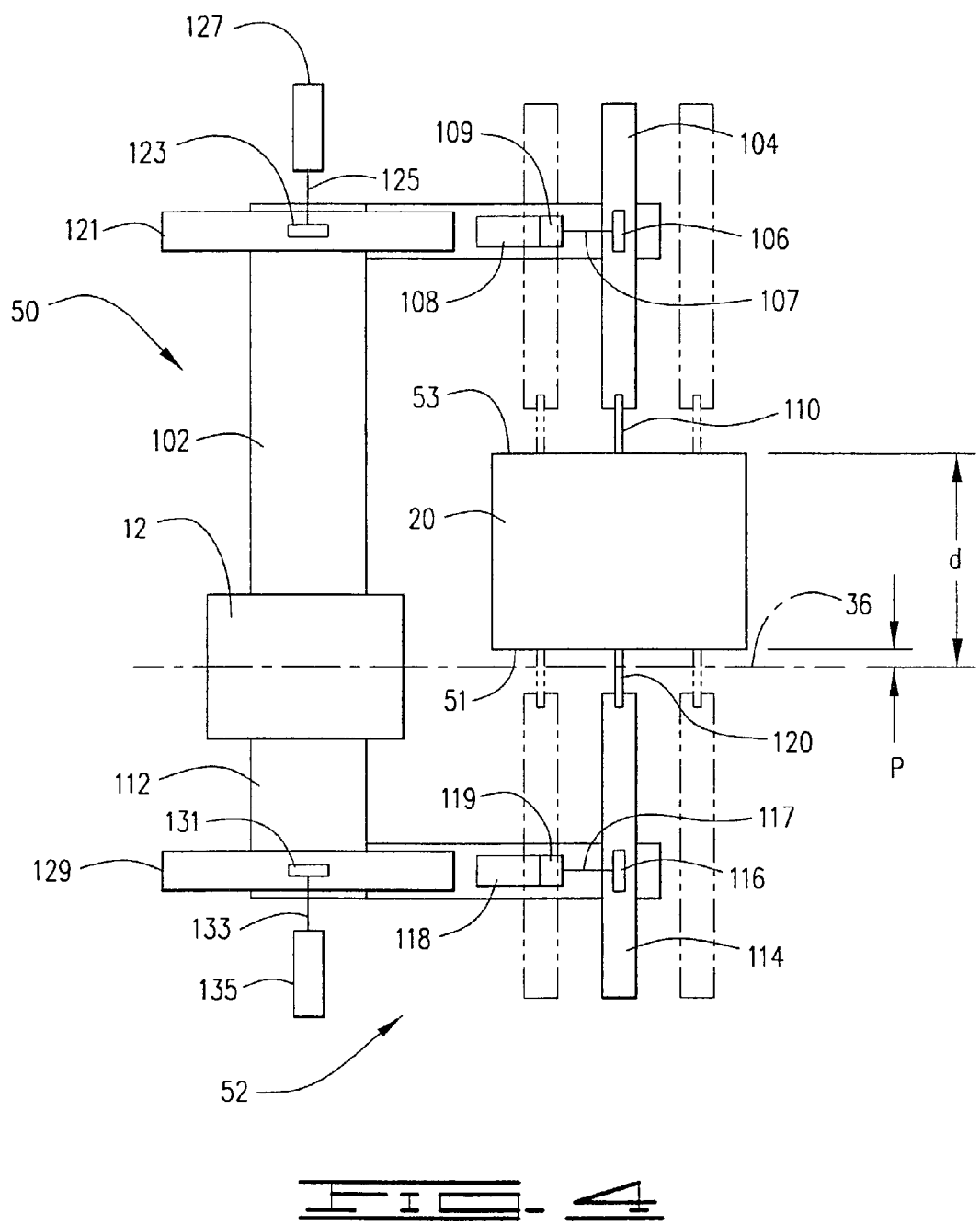
FIG. 4 is a detail of a left elevation showing the material distal and proximate displacement sensors.

As seen in FIGS. 3 and 4, workpiece 20 has a proximate surface 51 that is the side of the workpiece that faces datum plane 36. Workpiece 20 also has a distal surface 53 that is on the opposite side of the workpiece from proximate surface 51 and generally parallel thereto. Stated in another way, proximate surface 51 is the side of workpiece 20 nearest datum plane 36, and distal surface 53 is the farthest away from the datum plane.

Referring still to FIGS. 3 and 4, details of distal displacement sensor 50 and proximate displacement sensor 52 are shown. Distal displacement sensor 50 includes a bracket 102 attached to saw 11. In the illustrated embodiment, bracket 102 supports a gear rack 104 that is adapted to be moved toward and away from datum plane 36. Gear rack 104 is engaged by a pinion gear 106 driven through a shaft 107 by a motor 108. A rotary encoder 109 is at one end of motor 108. A distal displacement probe 110 is attached to an end of gear rack 104.

Proximate displacement sensor 52 is constructed in a manner similar to distal displacement sensor 50 and includes a bracket 112 attached to saw 11. Bracket 112 supports a gear rack 114 that is adapted to be moved toward and away from datum plane 36. Gear rack 114 is engaged by a pinion gear 116 driven through a shaft 117 by a motor 118. A rotary encoder 119 is at one end of motor 118. A displacement probe 120 is attached to an end of gear rack 114.

Distal displacement sensor 50 and proximate displacement sensor 52 may be moved laterally toward and away from saw head 14 as also seen in FIGS. 3 and 4 to sense the distal or proximate surface at the point where the desired dimensions are to be measured. Distal displacement sensor 50 is attached to a gear rack 121 engaged by a pinion gear 123 driven through a shaft 125 by a motor 127. It will be been seen by those skilled in the art that actuation of motor 127 will result in lateral movement of sensor 50 as indicated by dashed lines in FIGS. 3 and 4. Similarly, proximate displacement sensor 52 is attached to a gear rack 129 engaged by a pinion gear 131 driven through a shaft 133 by a motor 135, and actuation of motor 135 results in lateral movement of sensor 52.

To determine the distal displacement d of distal surface 53 of workpiece 20 from datum line 36, distal displacement sensor 50 is laterally positioned as just described. The distal surface is measured when motor 108 is actuated to drive pinion gear 106 and moves gear rack 104 toward the datum line until distal displacement probe 110 senses the distal surface of the workpiece. Encoder 109 sends a distal displacement signal to CPU 48 corresponding to the movement of distal displacement probe 110. Similarly, to determine the proximate displacement p of proximate surface 51 of workpiece from datum line 36, proximate displacement sensor 52 is laterally positioned. The proximate surface is measured when motor 118 is actuated to drive pinion gear 116 and moves gear rack 114 until displacement probe 120 senses the proximate surface of the workpiece. Encoder 119 sends a proximate displacement signal to CPU 48 corresponding to the movement of proximate displacement sensor 120. The details of how the distal and proximate displacement information is used will be discussed further herein.

The method of measuring can be probed as described above or continuously measured along the length of the part, sometimes referred to as tracked. Measuring at least at each end of the part determines how the material varies as the material is fed toward saw head 14.

Distal and proximate probes 110 and 120 are of a kind known in the art. A great variety of probes could be used in the present invention. Typical probes could be contact probes, proximity probes, and through-beam probes. Examples of contact probes include, but are not limited to, snap-action switches, snap-action valves, linear variable differential transformers, potentiometers, Piezo-electric, ultrasonic, and Hall-effect rotary sensors. One specific example of a snap-action switch is Model 5 SE1 manufactured by Micro Switch, Honeywell, Inc. Examples of proximity probes include, but are not limited to, laser trigonometric, pneumatic non-contact, electromagnetic induction, ultrasonic, radar and capacitance probes. Examples of through-beam probes include, but are not limited to, lasers, light curtains, and pneumatic non-contact probes.

Any of these probes can be moved by a variety of actuators. The path of motion of the actuators can include linear and rotary. The type of motion can be free where the probe comes in contact with the part itself, or it may be stopped where it has no direct contact with the part.

The actuators can have a variety of linkage elements with different prime movers. Examples of linkage elements include, but are not limited to, rack and pinion such as that shown in FIGS. 3 and 4, screw and nut, belt and pulley, chain and sprocket, crank or eccentric and linkage, epicyclical or planetary mechanisms, slide, pivot, shaft, coupling, gear train, and screw and worm gear mechanisms. The prime mover can include, but is not limited to, hydraulic or pneumatic cylinders, hydraulic or pneumatic fluid motors, linear or rotary electric motors including servo motors, hydraulic or pneumatic servo motors including linear or rotary, linear or rotary stepper motors, linear or rotary electric solenoids, as well as manual adjustment.

Examples of rotary measuring systems include, but are not limited to, pulse or absolute encoders including optical and magnetic, resolvers, Hall-effect rotary sensors, and potentiometers. Examples of linear measuring systems include, but are not limited to, pulse or absolute encoders including optical and magnetic, magnitoresistive, Hall-effect rotary sensors, and potentiometers.

Thus, the invention is not intended to be limited to any particular type of probe. The key factor is that the distal and proximate displacement signals are sent from the probes to CPU 48 in a manner described further herein.

Referring now to FIGS. 5A and 5B, a flow chart of control system 10 is shown, and the cutting process will be generally described. Initial distal and proximate displacement signals are sent to CPU 48 by distal and proximate displacement sensors 50 and 52, respectively. Also, any input from the operator is initially entered into CPU 48. This input can include the design dimensions of the parts to be cut from workpiece 20 or any other desired information related to the cutting operation. The initial distal and proximate displacement signals provide information to the software installed in CPU 48 as to the size and position of workpiece 20 at the beginning of the operation, and this information is compared with the operator input to calculate the feed length along feed table 12 and the pivot angle of saw head 14 to compensate for material errors and other variations.

The vise position and saw head position signals are then sent to motors 24 and 44, respectively, to move vise 16 to the calculated longitudinal position (the feed length) and to pivot saw head 14 to the calculated cutting angle. Movement is determined by the vise position signal from vise position sensor 56 and the saw head position signal from saw head position sensor 46. Then, vise 16 engages the workpiece and moves the workpiece toward the saw.

A final distal displacement signal from distal displacement sensor 50 and a final proximate displacement signal from proximate displacement sensor 52 are then transmitted to CPU 48. Thus, any change in the material displacements as a result of the movement of workpiece 20, or variations in the dimensions thereof, is taken into account. The software in CPU 48 then calculates any adjustments necessary to the feed length and blade angle to compensate for these changes, and additional signals are sent to motors 24 and 44 as necessary.

This process will now be discussed in more detail. In particular, variations in the process depending on the shape of the final cut pieces and on the critical dimensions thereof are illustrated.

Figure 6:
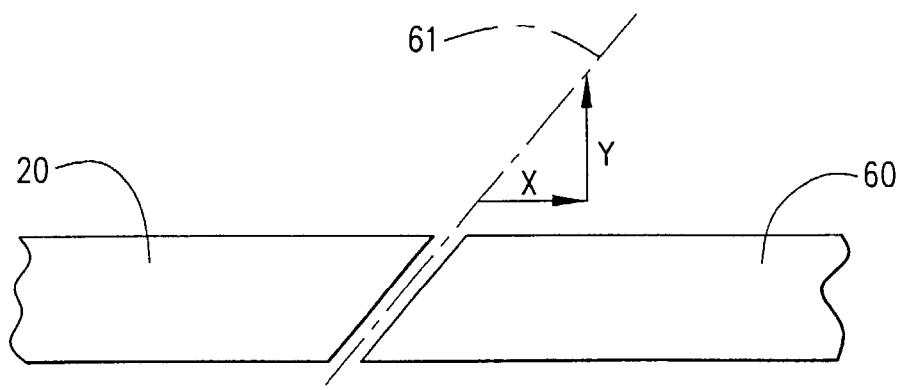
FIG. 6 is an illustration showing a workpiece with a typical mitered cut therethrough.

Referring to FIG. 6, an example of a cut piece 60 is shown cut from workpiece 20. There are a number of measurement factors that can affect the accuracy of the final parts. The distance (feed length) that shuttle vise 16 longitudinally moves workpiece 20 in the process of feeding the parts will have certain tolerances as a result of inherent limitations in miter saw apparatus 11 itself. Likewise, the cutting angle at which saw head 14, and thus at which blade 28 of miter saw 11 passes through workpiece 20 will have tolerances that result in variations in cut pieces 60. Accuracy of cut parts, such as cut piece 60, is controlled by the combined effects of these tolerances and of the previously mentioned material tolerances. Also, there are tolerances in the typical measuring equipment that potentially can affect the cutting operation. However, the measuring equipment can measure the dimensions and angles much more closely than the apparatus can practically position workpiece 20 and saw head 14, so the limitations of the measuring equipment are not really a significant concern. The measurement tolerances are known because the manufacturers of the equipment provide them, and programming of CPU 48 can be easily adjusted to take this into account to optimize the cutting process.

In designing the parts to be produced from workpiece 20, such as cut piece 60, the designer must make certain assumptions about the size and shape of the stock material forming the workpiece. Only the cut surfaces are controlled by miter saw 11. The other surfaces of the parts are the original raw stock surfaces. All elongated material stock, such as workpiece 20, varies from its ideal dimensional sizes. If these variations are within industry-accepted standards, then the stock is said to meet mill tolerances. These ranges vary with different industries to meet the physical demands of the material process used to make it, and within these ranges, the material is considered "fit for use." However, these mill tolerances allow wide variations in shape and dimension of the material that frequently cause problems in producing precision parts on a miter saw.

FIGS. 7–11 illustrate typical material variations that may be confronted by the designer and must be addressed. These illustrations are provided for square tubing, but these kinds of variations are common for other cross-sectional shapes as well. The invention is not intended to be limited to use with any particular shape of elongated material forming workpiece 20.

Figure 7:
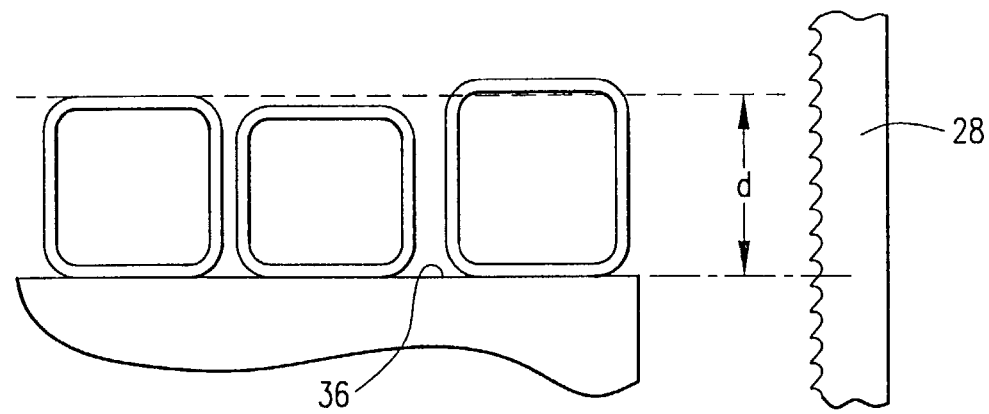
FIG. 7 illustrates displacement errors due to mill tolerances in square tubing.
Figure 8:
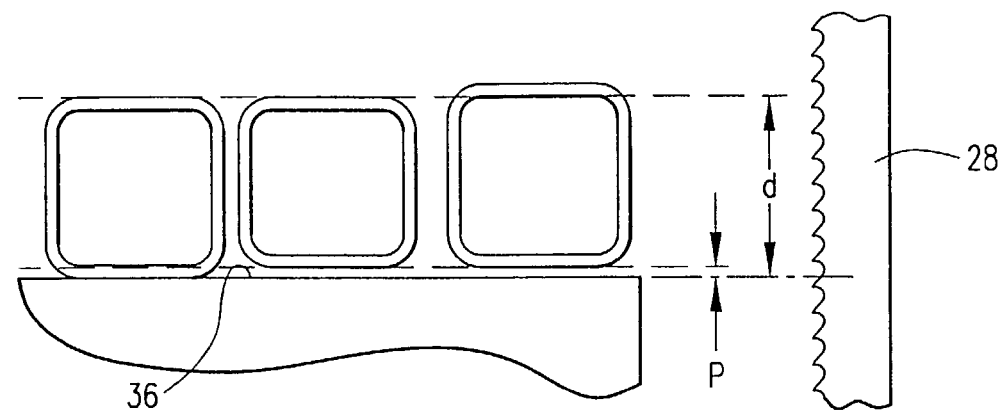
FIG. 8 shows errors in distal and proximate displacements of square tubing.

In FIG. 7, the piece on the left is the ideal shape, the center piece is thinner than ideal, and the piece on the right is thicker. As can be seen, the distal displacement d of the material from datum line or plane 36 can vary greatly from what would be considered nominal for "square" tubing and thus can be closer or farther than anticipated in the designed part. In addition, as seen in FIG. 8, there may be a proximate displacement p of the proximate surface of the material from datum line or plane 36. The piece on the left is ideal, and the proximate surface of the center piece is spaced away from datum line 36 although the distal surface is at the expected distal displacement d. The piece on the right is shown with ideal thickness, but spaced away from datum line 36. The proximate displacement can be a result of warping or curvature of elongated workpiece 20 over its length.

Figure 9:
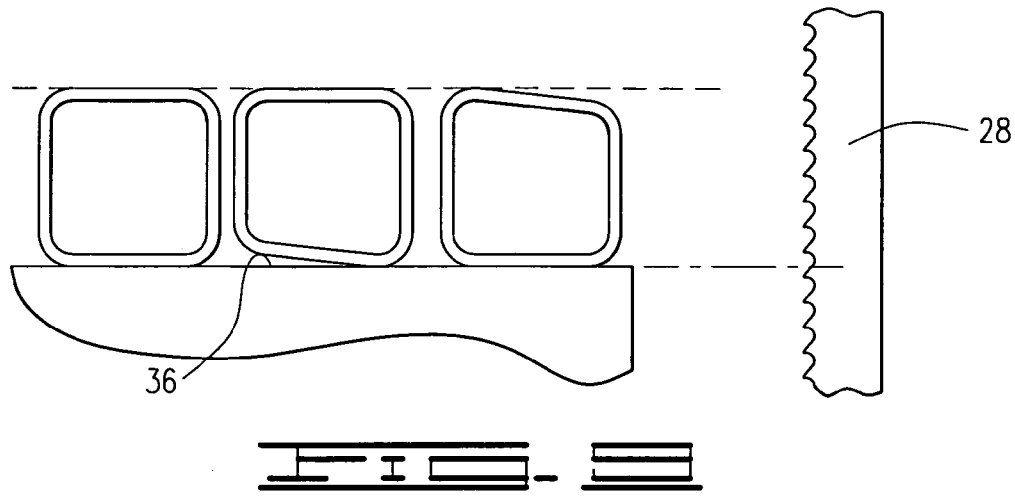
FIG. 9 shows errors in the shape of square tubing resulting from unparallel sides.
Figure 10A:
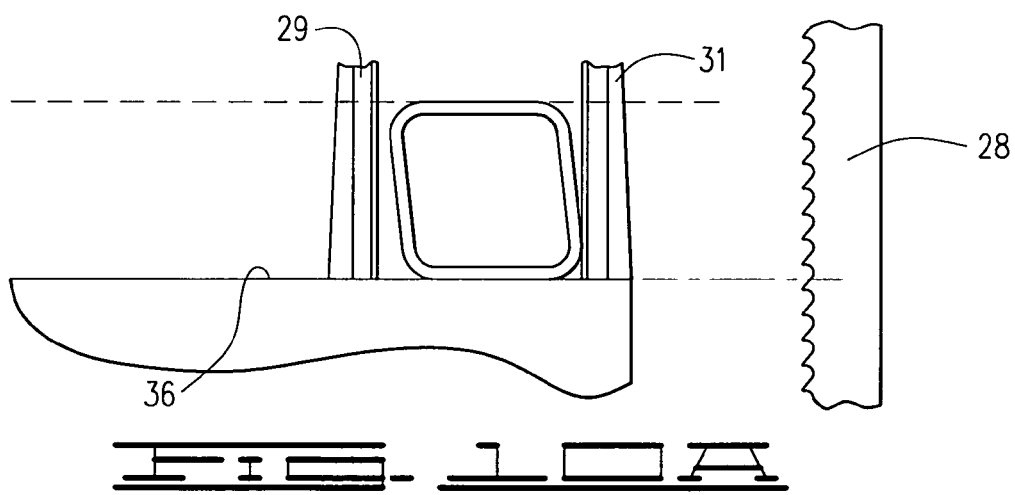
FIGS. 10A and 10B illustrate how vise jaw engagement on a workpiece may be affected by material shape variations.
Figure 10B:
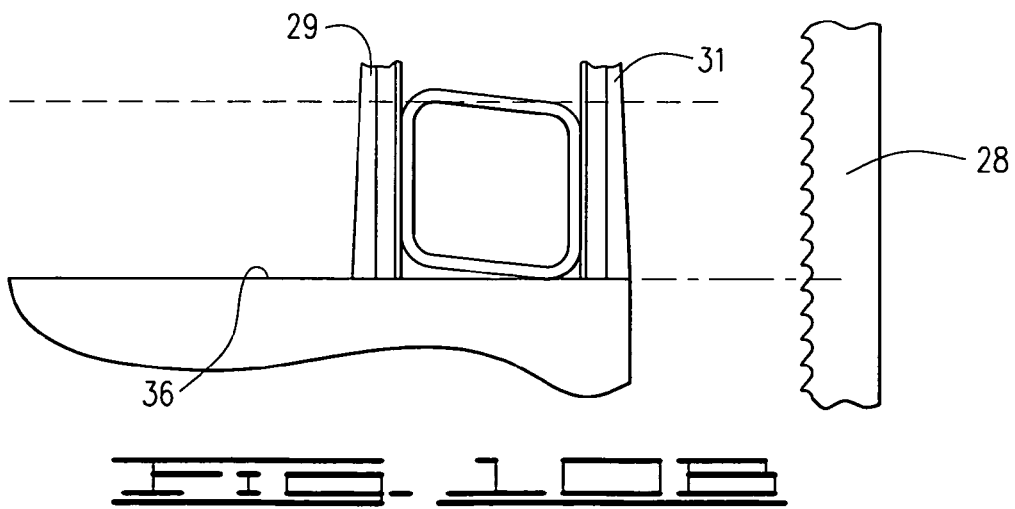
Figure 11:
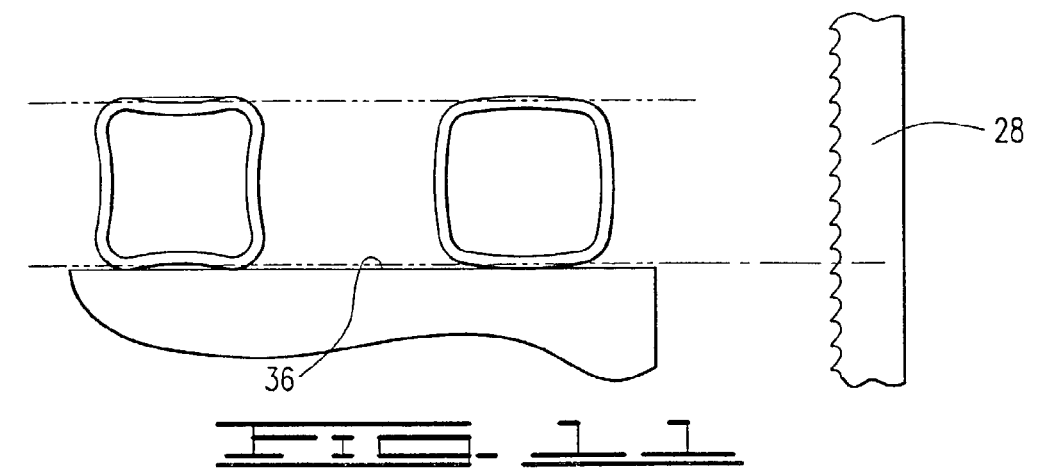
FIG. 11 shows errors in the shape of square tubing resulting from convex or concave side walls.

The walls of the tubing may not be parallel as seen in FIG. 9, and this can result in a distal or proximate displacement that is different than nominal, at least on some part of the tubing. Again, the piece on the left is the ideal, substantially square shape. The piece in the center has a nonparallel proximate surface, and the piece on the right has a nonparallel distal surface. Similarly out-of-parallel and squareness errors, as seen in FIGS. 10A and 10B, can affect how the part is engaged by vise jaws 29, 31. Jaws 29, 31 are open in FIG. 10A and closed in FIG. 10B.

Additionally, the walls of the tubing may not be flat, resulting in convex (left side of FIG. 11) or concave (right side of FIG. 11) shapes. Again, this can affect engagement and the distal and proximate displacements of the material.

The finish dimensions of cut pieces 60 are determined where the stock dimensions intersect the cutting planes. Referring again to FIG. 6, a typical angled cutting plane 61 in a miter saw has a transverse component Y perpendicular to the longitudinal axis of workpiece 20 and an axial component X that is parallel to that longitudinal axis. As is known in the art, the greater the angle of cutting plane 61 from a plane perpendicular to the axis, the greater the significance of the axial component X. It will be seen that variations in the cross-sectional dimensions thus also have a correspondingly significant effect on the cut dimensions measured along the longitudinal axis of the material stock.

When a designer determines the desired cut configuration of a part, there are certain important dimensional criteria that must be held within given tolerances. Other dimensional criteria, which are less critical to the performance of the part and are under the influence of the dimensions of the stock material, must be afforded a greater tolerance. These dimensional criteria include, but are not limited to, first or proximate surface length, second or distal surface length, first or initial cutting angle, second or final cutting angle, and/or linear or longitudinal offset between the proximate and distal surfaces.

Figure 12:
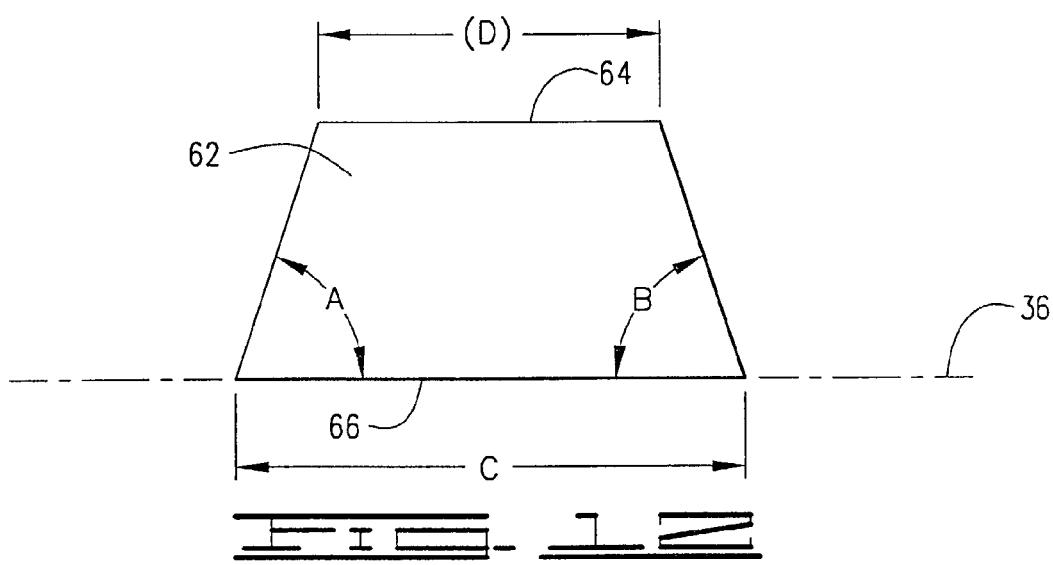
FIG. 12 illustrates typically important dimensions for a cut piece in a miter saw operation.

For example, if part 62 to be cut has a linear section in a generally trapezoidal shape, such as shown in FIG. 12, there are several features that may be critical. The thickness of part 62, or the distance between distal surface 64 and proximate surface 66 thereof, will be fixed by that dimension in the material stock. Once this is determined, critical dimensions that can be defined by the designer are the lengths of the distal and proximate surfaces and/or the angles of the end cuts. As shown in FIG. 12, all miter dimensions are measured from datum line 36 which, as already mentioned, is the plane in which pivot axis 38 of saw head 14 is normally located. In FIG. 12, proximate surface 66 is in that plane.

The critical features may be defined in different ways, as previously noted. The saw can directly measure only the length of stock along datum plane 36 and the angle of the miter saw relative to this datum plane. Any other desired dimensions must be derived from these.

A first, and most direct, method to define a part is to specify length C of proximate surface 66 and initial and final angles A and B of the two end cuts. If length C and angles A and B are to be held to the required dimensions, then length D of distal surface 64 must be allowed to vary.

Once this is done, an ideal part 62 is completely defined, and miter saw 11 can use these dimensional criteria directly to feed material to a distance equal to the length of the proximate surface plus the kerf and cut the part at the required angles. Of course, if the workpiece is not the ideal size or shape, and/or if the workpiece is spaced away from datum plane 36, then the parts will be wrong. The present invention compensates for the errors in this method, by varying the length of the material fed along the datum plane to produce the desired length along proximate surface 66, in response to signals generated by sensors 50 and 52.

Figure 13:
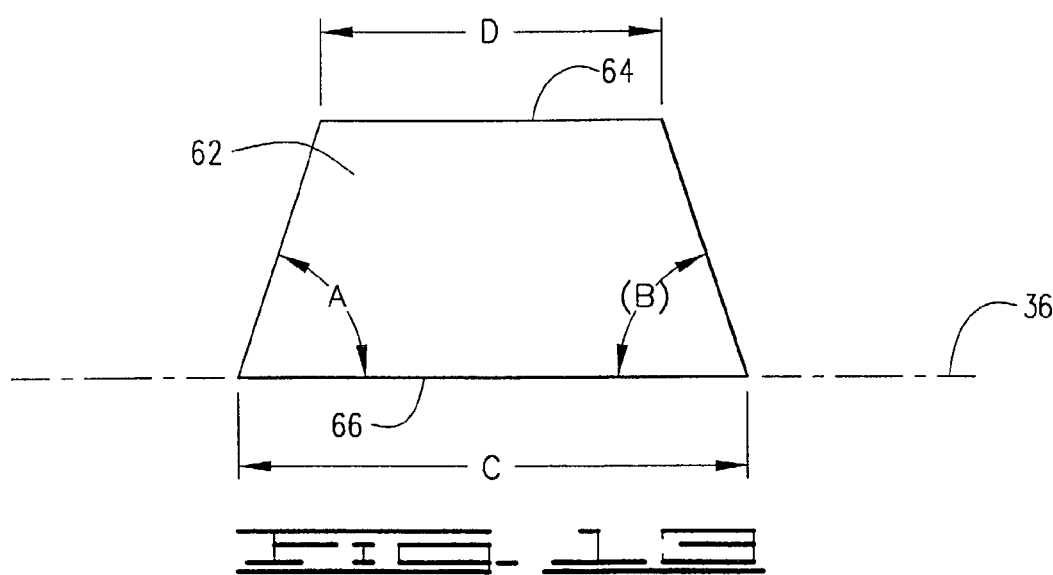
FIG. 13 shows alternative important dimensions for the cut piece in a miter saw operation.

A second method is to define length D of distal surface 64 and length C of proximate surface 66 and one of end angles A or B, as shown in FIG. 13. Length D of distal surface 64 cannot be directly measured, so the programming of CPU 48 in control system 10 must calculate second end angle B to produce desired distal surface length D dimension. If lengths C and D and angle A are to be held to the required dimensions, then end angle B (opposite to angle A) must be allowed to vary.

Once this is done, an ideal part 62 is completely defined, and miter saw 11 can use these dimensional criteria directly to feed material to a distance equal to the length of the proximate surface plus the kerf and cut the part at the required angles. Of course, if the workpiece is not the ideal size or shape, and/or if the workpiece is spaced away from datum plane 36, then the cut parts will be wrong. The present invention compensates for the errors in this method, by varying the length of the material fed along the datum plane to produce the desired length along proximate surface 66 and end angle B (opposite to angle A) to maintain the length along distal surface 64, in response to signals generated by sensors 50 and 52.

Figure 14:
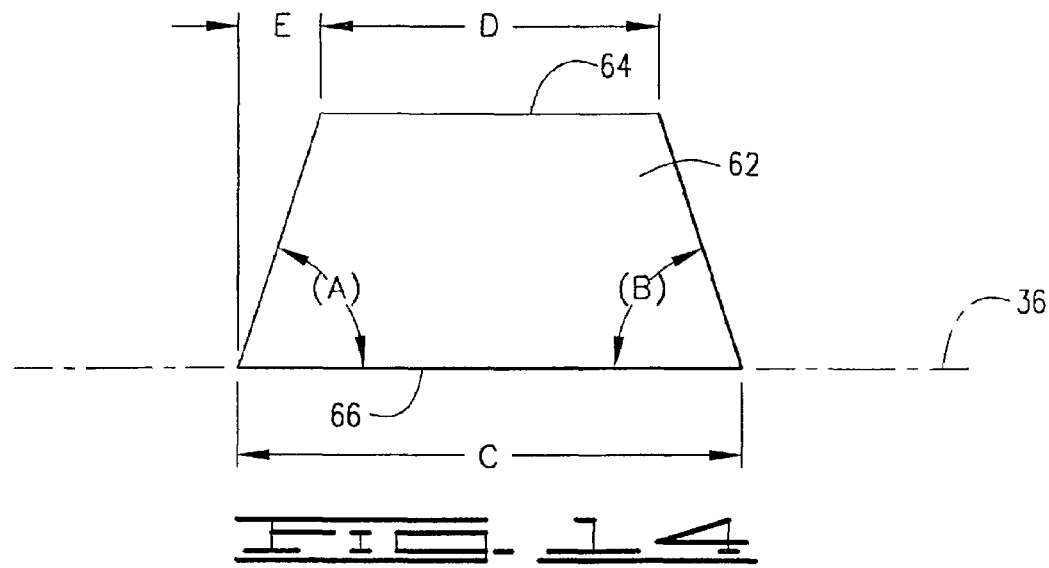
FIG. 14 illustrates another alternative example of important dimensions for the cut piece in a miter saw operation.

In a third method shown in FIG. 14, length D of distal surface 64 and length C of proximate surface 66 along with a linear offset E between them. Only length C can be directly measured. Cutting angles A and B, resulting from the offset, must be calculated on each end. If lengths C and D and offset E are to be held to the required dimensions, then angles A and B must be allowed to vary.

Once this is done, an ideal part 62 is completely defined, and miter saw 11 can use these dimensional criteria directly to feed material to a distance equal to the length of the proximate surface plus the kerf and cut the part at the required angles. Of course, if the workpiece is not the ideal size or shape, and/or if the workpiece is spaced away from datum plane 36, then the cut parts will be wrong. The present invention compensates for the errors in this method, by varying the length of the material fed along the datum plane to produce the desired length along proximate surface 66 and end angles A and B to maintain the length along distal surface 64, in response to signals generated by sensors 50 and 52.

In a fourth method (not shown), length D of distal surface 64 and the initial and final angles A and B of the two end cuts may be specified. In this case only the two end angles can be measured directly. If length D and angles A and B are to be held to the required dimensions, then length C of proximate surface 66 must be allowed to vary.

Once this is done, an ideal part 62 is completely defined, and miter saw 11 can use these dimensional criteria directly to feed material to a distance equal to the length of the proximate surface plus the kerf and cut the part at the required angles. Of course, if the workpiece is not the ideal size or shape, and/or if the workpiece is spaced away from datum plane 36, then the cut parts will be wrong. The present invention compensates for the errors in this method, by varying the length of the material fed along the datum plane to produce the desired length along distal surface 64, in response to signals generated by sensors 50 and 52.

In each of the above cases, the required dimensions are defined. The feed and angles must then be adjusted in order to compensate for the actual dimensions and location on the stock. This is done in response to signals generated by sensors 50 and 52.

In all cases, the cutting must compensate for the kerf in a manner known in the art. The kerf is the amount of material removed by the actual cutting action of the saw blade. That is, the blade destroys a certain amount of material when it passes through the workpiece, and this kerf must be considered when determining the actual cut length of the part.

Figure 15:
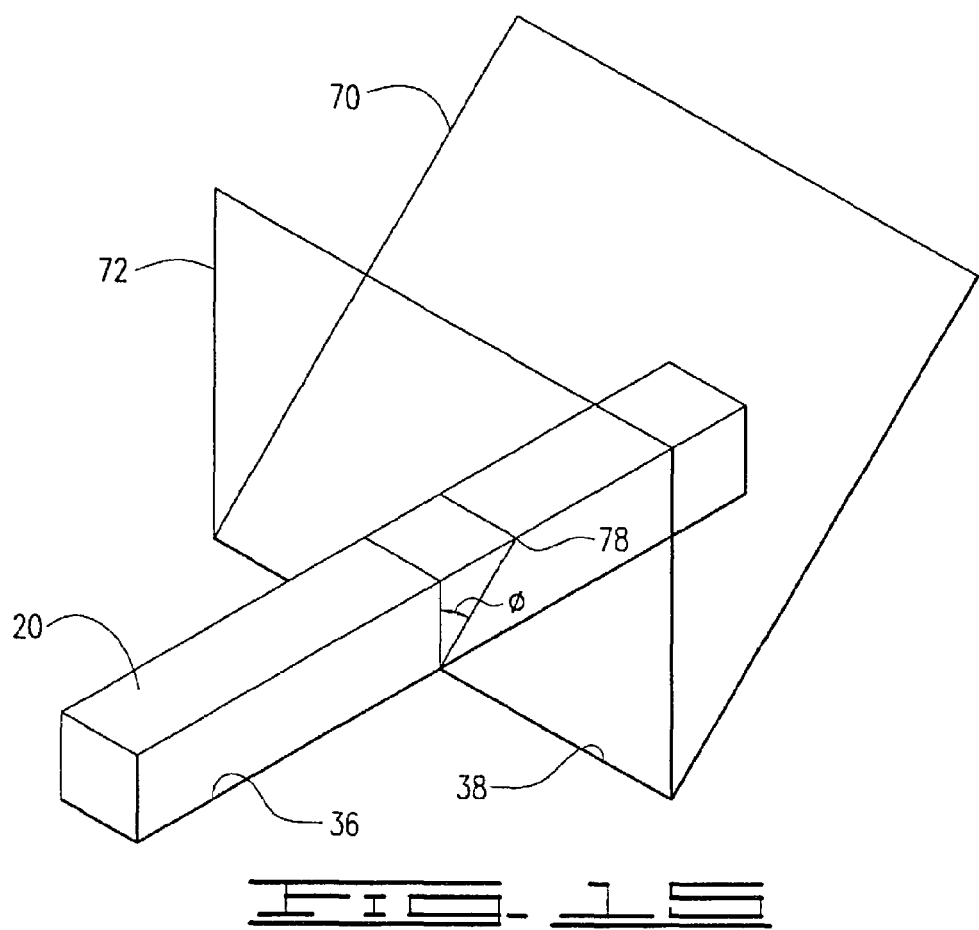
FIG. 15 shows a perspective illustrating an angled cutting plane.

Referring now to FIGS. 15 and 16, the angle of cutting will be discussed in more detail. A cutting plane 70 is shown through workpiece 20 angularly offset about pivot axis 38 from a plane 72 perpendicular to datum plane 36. This angle of pivotation is indicated by Ø. The thickness of workpiece 20 is indicated as t. The length of distal surface 76 from perpendicular plane 72 to a point of intersection 78 of cutting plane 70 with distal surface 76 of workpiece 20 is indicated by l. Thus, a triangle is described. Knowing thickness t of the material and cutting angle Ø, length l may be easily calculated by the following formula:

$$l = t \cdot \tan(\text{Ø})$$

In the example shown in FIGS. 15 and 16, proximate surface 74 of workpiece 20 is in the same plane as pivot axis 38. This means that the distance from pivot axis 38 to distal surface 76 of workpiece 20 is the actual thickness t. However, as shown in FIGS. 7–11, a significant problem arises when the actual material dimensions vary from what is expected because of mill tolerances. Additional problems are caused if the displacement between proximate surface 74 and pivot axis 38 is not zero. That is, there may be a measurable proximate displacement therebetween. These errors in the material can cause the resulting cut parts to vary from their designed dimensions because saw blade 28 will not engage the material at the point where it was intended to engage it. The adjustments for these problems will now be discussed in detail.

In FIG. 17, the thickness of the material varies from the ideal value t by an error amount e. In this case, part 80, having a distal surface 82 and a proximate surface 84, is thicker than anticipated, although the problem is similar if the material is too thin. This changes the distal displacement in the previous formula from t to t+e. Actually, the distal displacement measured by distal displacement sensor 50 is this total t+e dimension. The length along distal surface 82 parallel to the longitudinal axis must be calculated by the following formula:

$$l_1 = (t+e) \cdot \tan(\text{Ø})$$

Thus, to calculate the change in length caused by the error, the ideal length is subtracted from this actual length:

$$l_1 - l = (t+e) \cdot \tan(\text{Ø}) - t \cdot \tan(\text{Ø})$$

This results in the length differential, Δl as follows:

$$\Delta l = e \cdot \tan(\text{Ø})$$

The total adjustment for length in cut part 80 will be the sum of the adjustments at each end.

Figure 18:
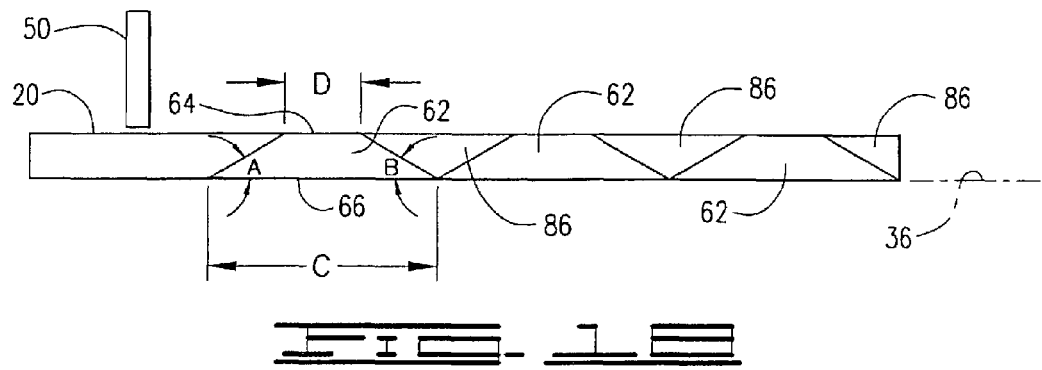
FIG. 18 illustrates cutting of a plurality of sequential parts from an elongated workpiece.

FIG. 18 illustrates how a series of sequential parts 62 can be cut from workpiece 20. The long side of parts 62 and workpiece 20 are shown in contact with datum plane 36. In this case parts 62 are cut one after the other. Because of the trapezoidal shape of parts 62, a generally triangular scrap piece 86 is created with each good part 62. The configuration of each cut part 62 is the same as previously discussed and illustrated in FIGS. 12–14, depending on which features are the critical ones, namely proximate surface length C, distal surface length D and/or angles A and B. Distal displacement sensor 50 determines the distal displacement of distal surface 64 away from datum line 36, and this information is used, as previously discussed, to adjust the feeding of workpiece 20 to achieve the desired length dimensions.

Figure 19:
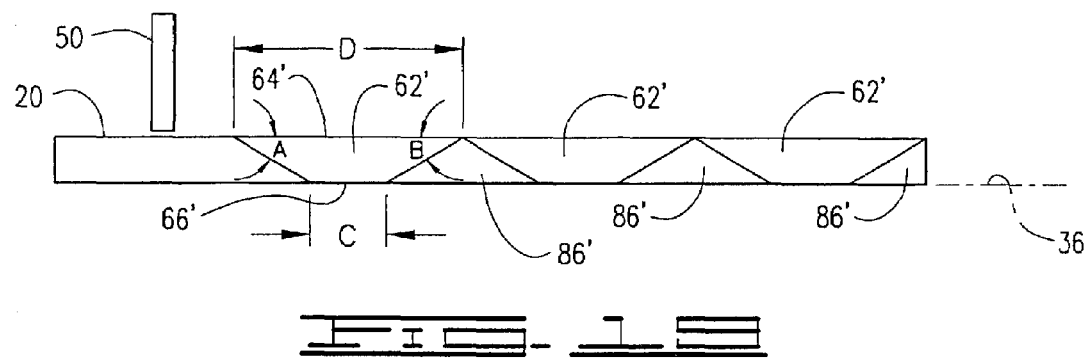
FIG. 19 shows an alternate way of cutting a plurality of sequential parts.

FIG. 18 shows a configuration wherein parts 62 are cut from workpiece 20 with distal surface 64 being shorter than proximate surface 66. FIG. 19 shows an opposite orientation of cut parts 62' with distal surface 64' longer than proximate surface 66'. Scrap pieces 86' are produced. In either case, control system 10 can be used to calculate the necessary feed length and cutting angles based on the critical features specified by the designer.

Figure 20:
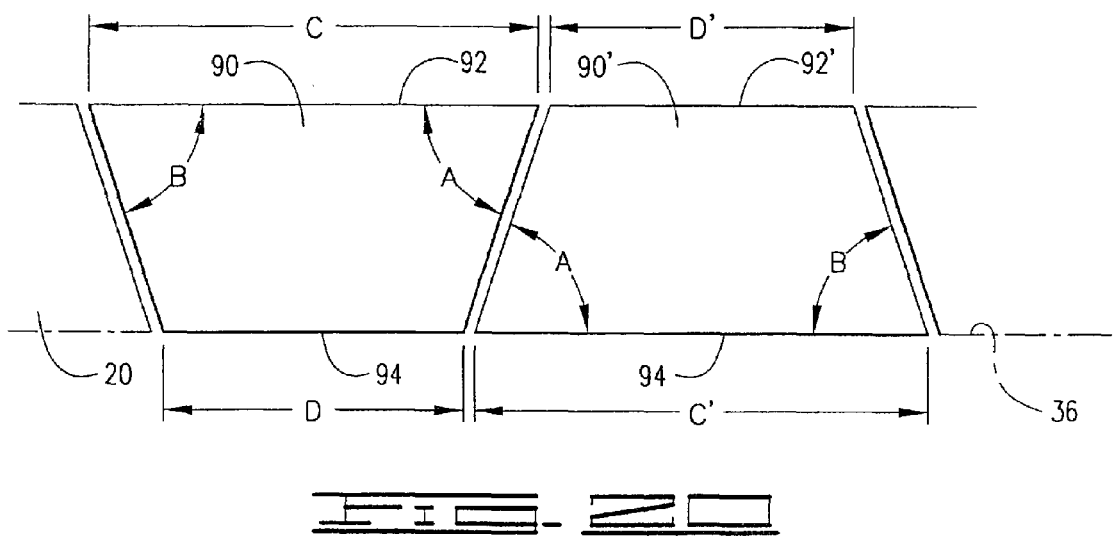
FIG. 20 shows cutting of nested parts from an elongated workpiece.

This form of cutting shown in FIGS. 18 and 19 is not very efficient in many cases, however. First of all, there is the obvious loss of scrap material 86 or 86' that adds to material costs. If the scrap material can be eliminated, then material costs will obviously be reduced. Secondly, each cut part requires two full cuts, one for each end. If the number of cuts can be reduced, then the amount of manufacturing time for each part can be correspondingly lowered. To do this, often the parts are nested as shown in FIG. 20. That is, alternating parts 90 and 90' are cut upside down from one another. Parts 90 have a distal surface 92 of length C that is longer than proximate surface 94 of length D. Conversely, part 90' has a distal surface 92' of length D' which is shorter than proximate surface 94' of length C'. This allows the complementary angles A and B on alternating parts to be adjacent to one another. It will be seen that this eliminates extra cutting operations and waste of material. That is, no scrap pieces are created except perhaps at the ends of workpiece 20. However, nesting does complicate the previously discussed calculation problems because the parts are produced in different orientations which necessitates different sets of measured and calculated dimensions.

Figure 21:
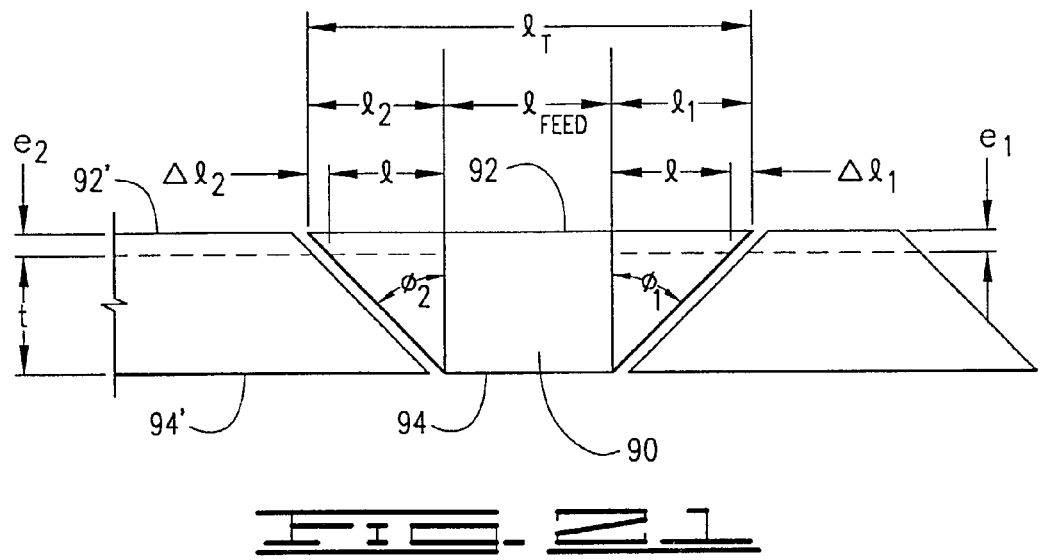
FIG. 21 illustrates errors in the length of a part caused by variations in height when the ends are cut at different angles.

Referring now to FIG. 21, the effect of the cutting angle upon the length of nested parts is seen to be reversed at each end. Assuming the cutting plane is alternately angled clockwise from perpendicular on the first cut and counterclockwise on the next cut, etc., this will make distal surfaces 92 longer and 92' shorter on the finished parts. Determining the proper feed length for parts 90 is not too complicated if the distal displacement of workpiece 20 is at its ideal dimension, but becomes more complex when the distal displacement varies. Using the same analysis as previously discussed for FIG. 17, the total compensation, $\Delta l_T$, for the errors caused by dimensional variations, which is the sum of the individual length compensations at the individual end cuts, becomes:

$$\Delta l_2 + \Delta l_1 = e_1 \cdot \tan(\text{Ø}_1) + e_2 \cdot \tan(\text{Ø}_2)$$

or, $$\Delta l_T = e_1 \cdot \tan(\text{Ø}_1) + e_2 \cdot \tan(\text{Ø}_2)$$

This takes into account that the errors $e_1$ and $e_2$ may not be the same at each end of the cut part, and also takes into account the potential difference in the initial and final cutting angles. That is, control system 10 actively measures the distal displacement and transmits a distal displacement signal at each end of part 90.

Figure 22:
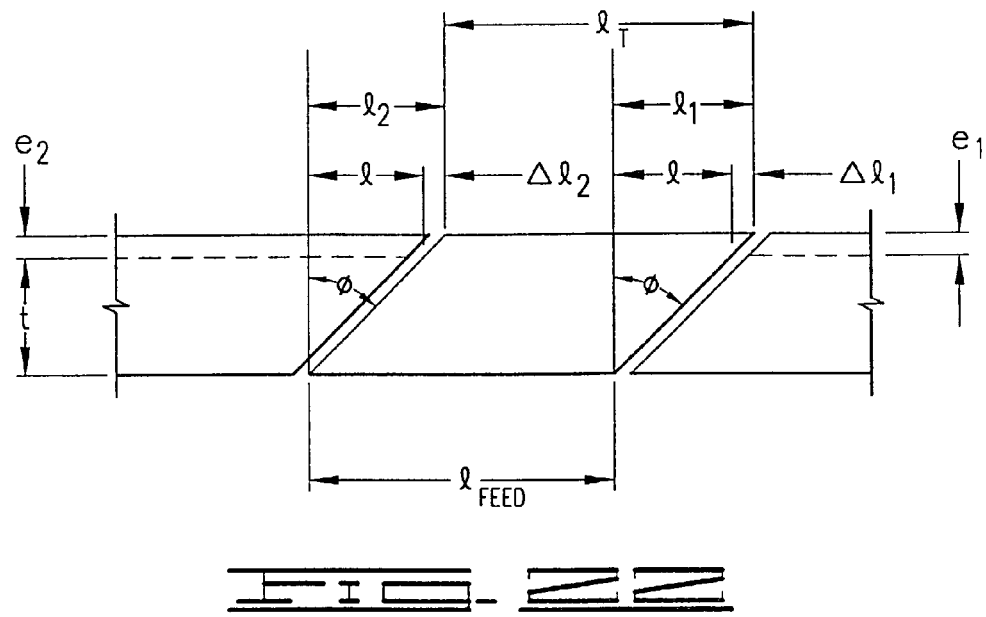
FIG. 22 shows the effect of variations in height on parts with parallel cuts.

If the part is substantially a parallelogram with the two cutting angles equal to Ø, and if errors $e_1$ and $e_2$ at each end are also equal, then the errors $\Delta l_1$ and $\Delta l_2$ produced by the miter saw are the same in both direction and magnitude, canceling out these effects so that there is no net change in the length of the finished part. This is illustrated in FIG. 22. If $e_1$ and $e_2$ are not equal, then the total error is not zero, and this can be compensated for in a manner similar to that previously described.

Figure 23:
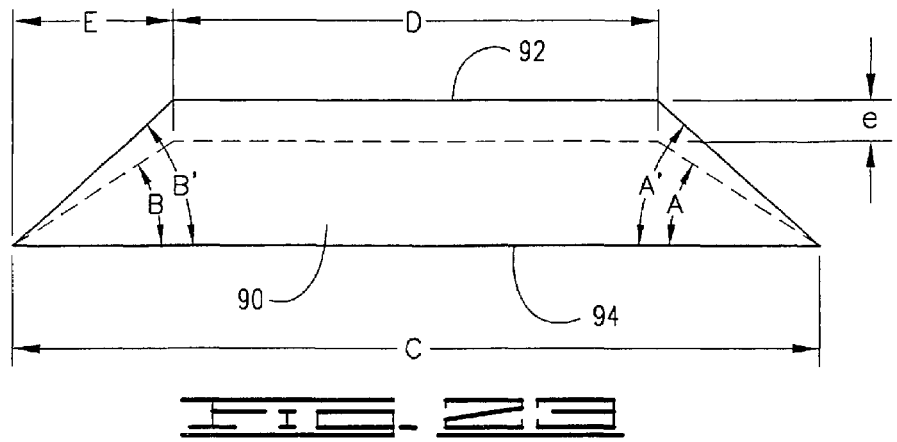
FIG. 23 illustrates how linear dimensions can be maintained by varying the miter angle when material height varies.

FIG. 23 illustrates an example of a situation where the lengths C and D of the proximate and distal surfaces, respectively, and the offset E between them are critical. In such cases, when the material thickness varies from the ideal by an error e, the end angles must be calculated and changed from the nominal values of A and B to corrected values of A' and B'. If error e is not the same at each end, then further compensation is required.

Figure 24:
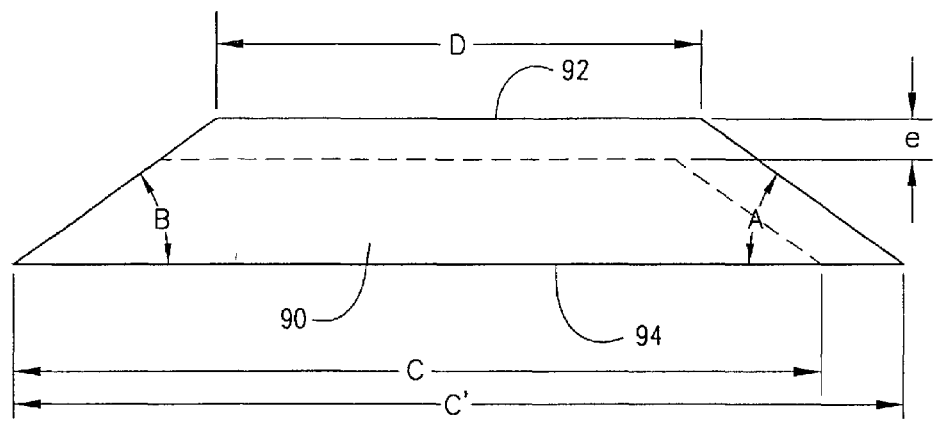
FIG. 24 illustrates compensation for material thickness variations by controlling the feed length to hold a distal surface length.

FIG. 24 illustrates a case where length D of distal surface 92 and end angles A and B are critical and must be maintained. A corrected length C', rather than nominal length C, must be calculated for proximate surface 94. Of course, length C' and any correction for kerf will determine the feed length of workpiece 20 after cutting first end angle A. If error e is not the same at each end, then further compensation is required.

Figure 25:
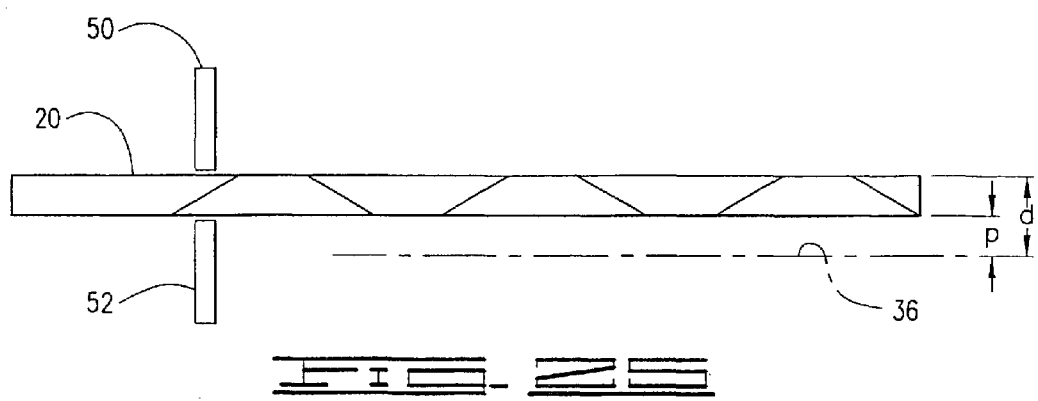
FIG. 25 illustrates a workpiece spaced away from the datum plane.

Most of the previous discussion has been directed to correction of feed length and cutting angle where the proximate surface of workpiece 20 lies in datum plane 36. Referring to FIG. 25, this may not actually be true, however, and any proximate displacement p of workpiece 20 away from datum plane 36 must be taken into account along with distal displacement d in calculating feed lengths and cutting angles. The proximate displacement p is measured by proximate displacement sensor 52 and the distal displacement d is measured by distal displacement sensor 50 and the corresponding proximate and distal displacement signal sent to CPU 48 that adjust the calculated values accordingly.

Figure 26:
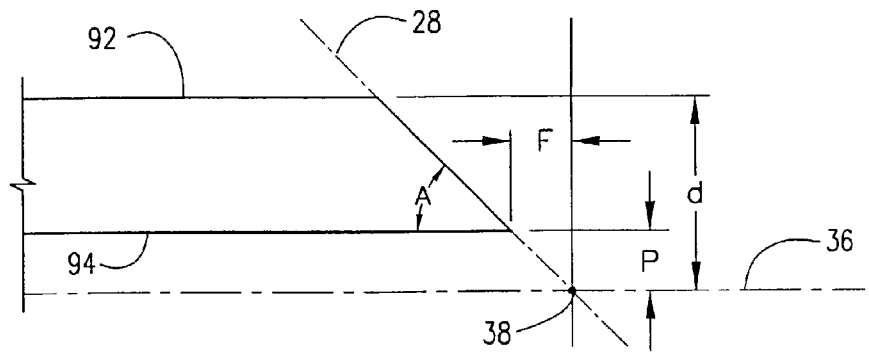
FIG. 26 shows an error caused by the displacement of the proximate surface of the workpiece from a datum plane when the saw blade is rotated to a first angle.
Figure 27:
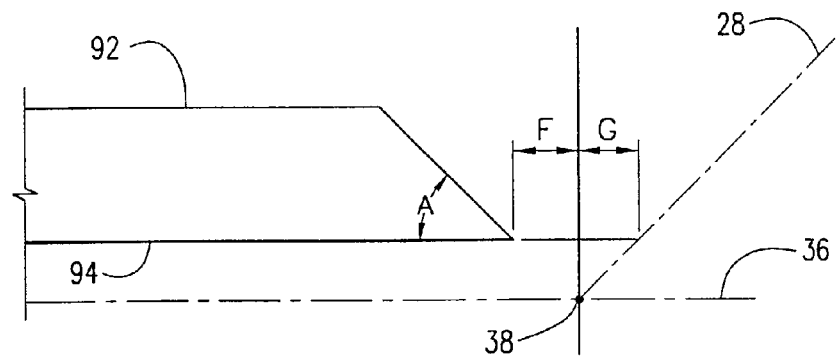
FIG. 27 shows an additional error created when the proximate surface of the workpiece is not in the datum plane and the saw blade is rotated to a second angle.
Figure 28:
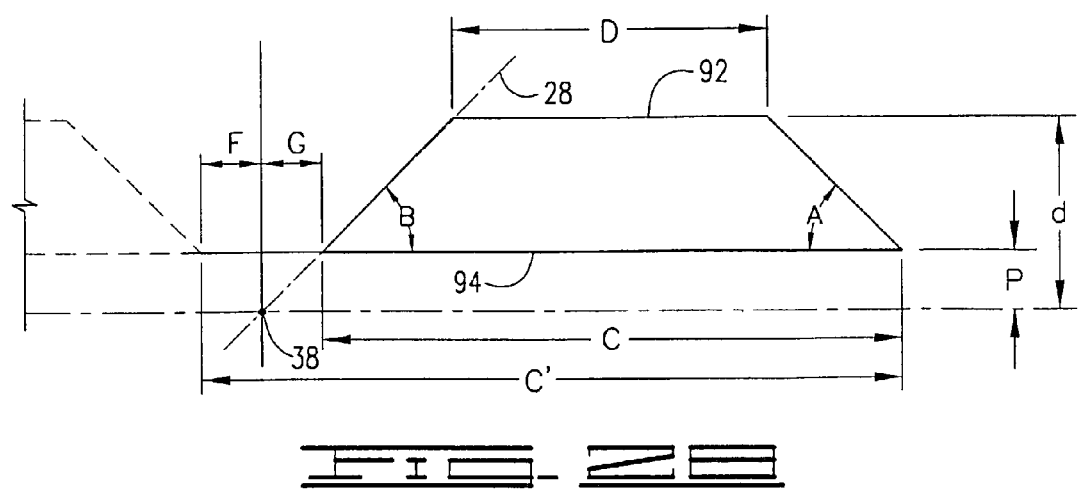
FIG. 28 illustrates correcting for the errors in FIG. 27.

Referring now to FIGS. 26–28, an example is shown where it is desired that the final part have a distal surface 92 with length D, proximate surface 94 with length C, and end angles A and B, but where the material is spaced from datum plane 36 by a proximate displacement p so that there is an actual distal displacement d. As seen in FIG. 26, this results in an offset F between the end of the part and pivot point 38. FIG. 26 also shows first angle A.

FIG. 27 shows the relationship between the material and saw blade 28 after cutting of angle A and after the blade has been pivoted to prepare for cutting of second angle B. As before, this results in an offset G between the end of the part that will be cut and pivot point 38. The material must be fed a length C' in order to compensate for proximate displacement p, as seen in FIG. 28, and to cut angle B so that the desired length C of proximate surface 94 is achieved. That is:

$$C' = C + F + G$$

Again, in all of these methods, the same part could be easily produced if the material stock thickness were accurate and the material were the proper shape and size and on the datum plane. However, this is unusual, and the present invention is designed to address the problems of material and displacement variations and make the necessary corrections to produce parts as accurately as possible with minimum test and scrap pieces.

The challenge of miter cutting of elongated workpieces is to adjust the cutting process to utilize stock with standard material tolerances from the mill and still be able to produce parts that maintain the critical design dimensions. In the past, the main difficulty faced by automatic miter cutting has been that the feed lengths and cutting angles called for by the miter saw controller were fixed and based upon the ideal or nominal dimension of the material. Those results could sometimes be improved upon by allowing the operator to measure the actual stock size of the workpiece and manually adjust the saw controller in an attempt to compensate for the variation. This process has had mixed results because of variation in dimensions and proximate displacement of the parts, as found in the nesting example described above, and the necessary but inaccurate assumption that the stock size is uniform throughout the length of the workpiece and that the workpiece is in the datum plane. Also, it has been necessary for the operator to edit the programming of the controller to compensate for the errors observed in earlier cuts. This practice results in wasted materials as well as time delays in production.

In the present invention, these problems are eliminated or minimized because the distal and proximate displacement dimensions are actively and automatically measured by distal displacement sensor 50 and proximate displacement sensor 52, and the feed lengths and cutting angles adjusted during the process to provide the necessary compensation in real time in order to maintain the important dimensional criteria of the finished parts. This eliminates the need for test parts and the intermediate program editing described above, and provides for continuous automatic adjustments if the dimensions of the material stock change or if the material moves off of the datum plane.

As already stated, all measurements on miter saw 11 are made relative to datum plane 36. The cutting angle from a plane perpendicular to the longitudinal axis of workpiece 20 is measured from datum plane 36, and also the feed length of the material on the feed table 12 is measured along the datum plane. Other important dimensions are also measured from this plane, namely the material stock size measured along the plane perpendicular to the longitudinal axis of workpiece 20 and the displacement of the proximate surface from datum plane 36.

Thus, the effect caused by variations in the material stock dimensions can be determined if the true size of the material is known so that control system 10 can compensate. As previously indicated, the dimensions and angles measured and/or calculated depend upon the choice of the designer of the part, as to which dimensions are the most critical and require the tightest tolerances, and which dimensions can be allowed to change to a greater degree. The programming in CPU 48 can be modified to allow the design dimensions that have the greatest priority to be indicated, along with the acceptable tolerances. In addition, distal and proximate displacement sensors 50 and 52 measure the size and location of the stock material of the workpiece and transmit that data to CPU 48 also. Control system 10 then adjusts the feed length and cutting angle for saw 11 in an effort to maintain the tolerances of the critical dimensions or to report to the operator if these dimensions are unobtainable. Since miter saw 11 has the capability of measuring the distal and proximate displacements of the stock during the actual sawing process, control system 10 actively compares this measured data with the ideal, nominal dimensions of the material to adjust the process parameters in real time as indicated by the previously discussed formulas to make up for the material variations. Thus, control system 10 provides several levels of control to compensate for errors in material size and shape. First, the program is adjusted at the beginning to maintain the critical dimensions based on the ideal material size. Secondly, the feed and angle are adjusted as described to compensate for variations that occur as the material is fed into the cutting area. The result is a system that acts to maximize the accuracy of the cut parts even when the material stock is not ideal.

In operation, as workpiece 20 is moved into cutting area 26, and before any cutting begins, general information is obtained by measuring the material with distal and proximate displacement sensors 50 and 52. This information is used to modify the program values. Once the sawing process starts, no other adjustments can be made. See again the flow chart of FIGS. 5A and 5B. Since saw 11 only makes adjustments in the feed length as measured on datum plane 36 and adjustments to the cutting angle measured from the datum plane, the programming in CPU 48 must convert the input values into the necessary series of feed lengths and cutting angles to produce the cut parts.

It will be seen, therefore, that the active measurement and control system for a miter saw of the present invention is well adapted to carry out the ends and advantages mentioned and those inherent therein. While a presently preferred embodiment of the invention is described herein for purposes of disclosure, numerous changes in the arrangement and construction of parts in the apparatus and in the steps of the method may be made by those skilled in the art. All such changes are encompassed within the scope and spirit of the appended claims.

What is claimed is:

1. A method of cutting parts from an elongated workpiece on a miter saw comprising the steps of:
   (a) selecting a nominal transverse dimension of the workpiece;
   (b) selecting at least two dimensional criteria of the parts from the group of criteria consisting of a first length dimension, a second length dimension, a linear offset between said first and second length dimensions, a first cutting angle and a second cutting angle;
   (c) providing sensing means on the miter saw for sensing at least one surface of the workpiece, and determining an actual transverse dimension of the workpiece with said sensing means as the workpiece is being fed longitudinally;
   (d) generating a feed length of the workpiece and a cutting angle of a saw head to position the workpiece and the saw head in response to any variation between said actual and nominal transverse dimensions; and
   (e) actuating the saw head for cutting the parts from the workpiece by cutting off a length of the workpiece such that the selected critical dimensional criteria are substantially maintained.

2. The method of claim 1 wherein the determining step of step (c) comprises measuring a displacement of the workpiece from a datum plane defined by the miter saw.

3. The method of claim 2 wherein said measuring comprises measuring a distal displacement of a distal surface of the workpiece.

4. The method of claim 3 wherein measuring the distal displacement comprises measuring at opposite ends of the workpiece.

5. The method of claim 3 wherein said sensing means comprises a sensor, and wherein said distal displacement is measured with said sensor comprising:
   a bracket;
   a gear rack moveably supported on said bracket;
   a probe attached to said gear rack and adapted for engaging a surface of said workpiece; and
   a pinion gear engaged with said gear rack such that rotation of said pinion gear results in movement of said probe toward or away from said workpiece.

6. The method of claim 5 wherein said sensor further comprises an encoder connected to said pinion gear for providing a signal in response to rotation of said pinion gear.

7. The method of claim 2 wherein said measuring comprises measuring a proximate displacement of a proximate surface of the workpiece.

8. The method of claim 7 wherein measuring the proximate displacement comprises measuring at opposite ends of the workpiece.

9. The method of claim 7 wherein said sensing means comprises a sensor, and wherein said proximate displacement is measured with a sensor comprising:
   a bracket;
   a gear rack moveably supported on said bracket;
   a probe attached to said gear rack and adapted for engaging a surface of said workpiece; and
   a pinion gear engaged with said gear rack such that rotation of said pinion gear results in movement of said probe toward or away from said workpiece.

10. The method of claim 9 wherein said sensor further comprises an encoder connected to said pinion gear for providing a signal in response to rotation of said pinion gear.

11. The method of claim 2 wherein said measuring comprises:
    measuring a distal displacement of a distal surface of the workpiece; and
    measuring a proximate displacement of a proximate surface of the workpiece.

12. The method of claim 11 wherein said measuring of the distal displacement and said measuring of the proximate displacement comprise measuring at opposite ends of the workpiece.

13. The method of claim 11 wherein said sensing means comprises a distal displacement sensor and a proximate displacement sensor, and wherein:
    said distal displacement is measured with distal displacement sensor comprising:
    a bracket;
    a gear rack moveably supported on said bracket;
    a probe attached to said gear rack and adapted for engaging a surface of said workpiece; and
    a pinion gear engaged with said gear rack such that rotation of said pinion gear results in movement of said probe toward or away from said workpiece; and
    said proximate displacement is measured with said proximate displacement sensor comprising:
    a bracket;
    a gear rack moveably supported on said bracket;
    a probe attached to said gear rack and adapted for engaging a surface of said workpiece; and
    a pinion gear engaged with said gear rack such that rotation of said pinion gear results in movement of said probe toward or away from said workpiece.

14. The method of claim 13 wherein each of said distal displacement and proximate displacement sensors comprises an encoder connected to the corresponding pinion gear for providing a signal in response to rotation of the corresponding pinion gear.

15. The method of claim 1 wherein:
    step (c) further comprises generating a signal in response to the determining of said actual transverse dimension and transmitting said signal to a controller of said miter saw.

16. The method of claim 1 wherein step (d) comprises adjusting said feed length to compensate for a kerf of said saw.

17. The method of claim 1 wherein said dimensional criteria include one of said length dimensions and said first and second cutting angles.

18. The method of claim 1 wherein said dimensional criteria include said first and second length dimensions and one of said first and second cutting angles.

19. The method of claim 1 wherein said dimensional criteria include said first and second length dimensions and said linear offset.

20. The method of claim 1 further comprising, after step (b), a step of transmitting said criteria to a controller of said saw.

* * * * *